Figure 1:
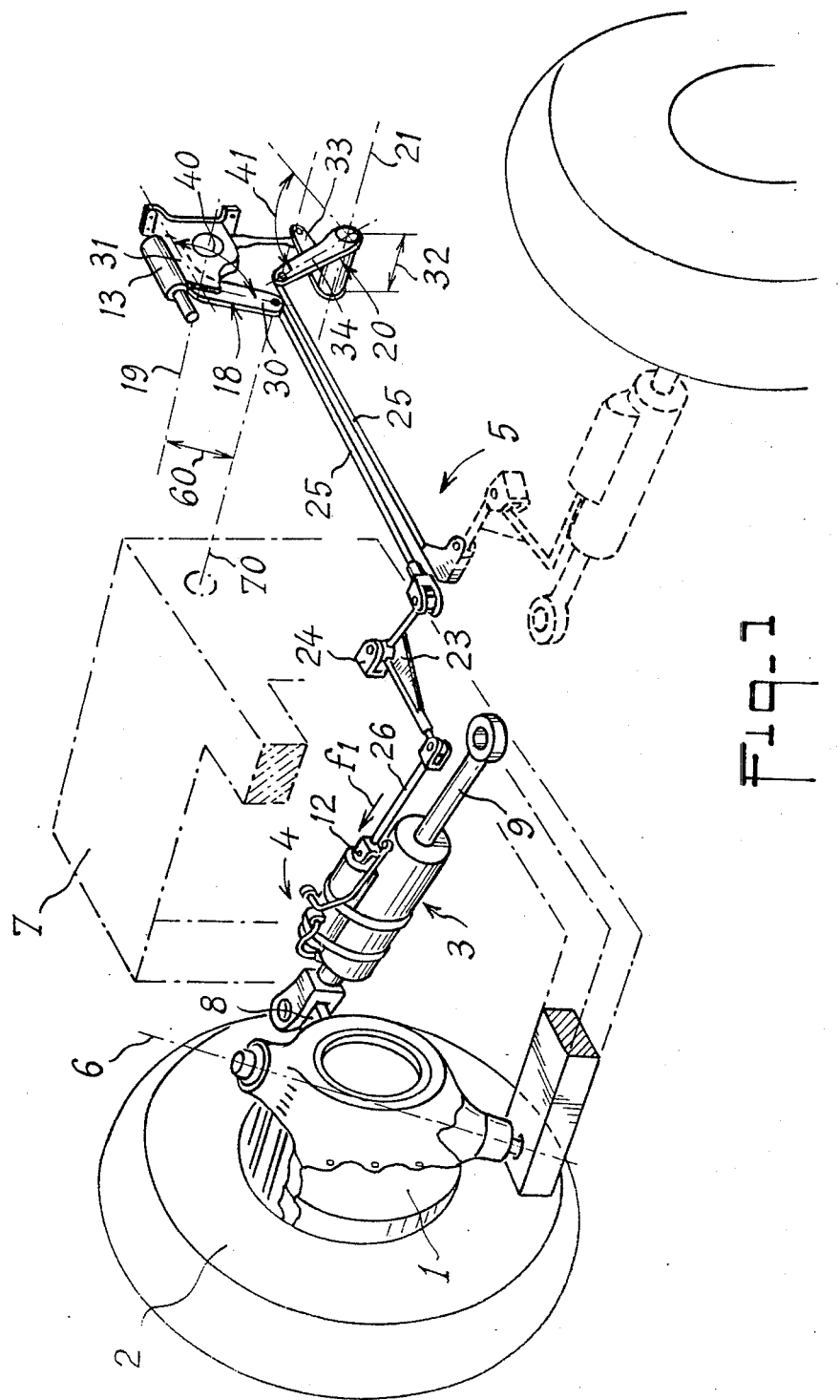

United States Patent [19]

Chanal

[11] 3,986,578

[45] Oct. 19, 1976

[54] DRIVE DEVICE FOR STEERING MECHANISM

[75] Inventor: Roger Chanal, Saint-Etienne, France

[73] Assignee: Etat Francaise Delegation Ministerielle pour l'Armement, France

[22] Filed: Mar. 27, 1975

[21] Appl. No.: 562,561

[30] Foreign Application Priority Data

Mar. 29, 1975 France .............................. 75.11915

[52] U.S. Cl. .............................. 180/158; 180/159; 91/216 A; 91/376 R
[51] Int. Cl.² ........................ B62D 5/08; B62D 5/10
[58] Field of Search .................. 180/79.2 R, 79.2 A, 180/79.2 C, 79.2 D, 154, 155, 158, 159; 91/216 A, 374, 376

[56] References Cited

UNITED STATES PATENTS

| 2,345,531 | 3/1944 | Ganahl | 91/216 A |
| 2,483,650 | 10/1949 | Lee | 180/79.2 R |
| 2,554,261 | 5/1951 | Munger | 180/79.2 R |
| 2,808,120 | 10/1957 | Hunter | 91/216 A X |
| 3,679,017 | 7/1972 | Roe | 180/79.2 R X |

*Primary Examiner*—M. H. Wood, Jr.
*Assistant Examiner*—R. Schrecengost
*Attorney, Agent, or Firm*—Brumbaugh, Graves, Donohue & Raymond

[57] ABSTRACT

A control device for a steering mechanism of a vehicle includes hydraulic means for laterally pivoting a pair of independently suspended guide wheels in response to rotation of a steering wheel of the vehicle. The hydraulic means includes a pair of double-acting jacks attached to respective guide wheels in such a manner that the extension of each jack pivots a corresponding guide wheel, and a pair of valves mounted on respective jacks for controlling the extension thereof. The valves are controlled by a pair of linkages which are connected to the steering wheel by a coupling mechanism in such a manner that the valves are simultaneously controlled in response to rotation of the steering wheel so that both guide wheels are laterally pivoted in the same angular direction.

7 Claims, 2 Drawing Figures

DRIVE DEVICE FOR STEERING MECHANISM

This invention relates to a drive device for the steering mechanism of a vehicle. The invention is more particularly applicable to an amphibious vehicle of the kind used for military purposes.

It is known that on this type of vehicle the wheels are mounted on suspension arms which should be capable of ensuring independently for each wheel, a very important vertical angle of wheel clearance. In effect this is rendered necessary due to the fact that when the vehicle floats on the water, the wheels should be completely withdrawn into the housings, but should be fully removable to enable maintenance and repair operations.

The conventional steering mechanism which uses a coupling bar does not enable a large turning angle to be ensured for the suspension arms. It can be established in effect that one such coupling bar introduces, for the important turning angles, unacceptable distorsions in the associated steering geometry.

The innvention has for its object remedying these disadvantges in prividing a steering mechanism which allows the suspension arms to be displaced freely in relation to one another according to the important turning angles to limit the distortions introduced into the steering geometry.

A device according to the invention for controlling the steering mechanism of a vehicle is characterized in that it comprises for each steerable wheel of the vehicle, a pivot box on which is pivoted, by its stub axle, the associated wheel and which is capable of pivoting in known manner around an axis having a small inclination with respect to the vertical. The angular position of the box with respect to this axis is controlled by means of a double-acting jack of the steering mechanism, one of the ends of the jack being pivoted on a fixed arm to the pivot box and the other end being pivoted to the associated suspension arm. The general axis of the jack of the steering mechanism is substantially transverse with respect to the axis of the pivot box. Means are also provided for feeding the jack of the steering mechanism in a manner such that the resulting change of its length is proportional to the angle of rotation made by the steering wheel of the vehicle.

Figure 2:
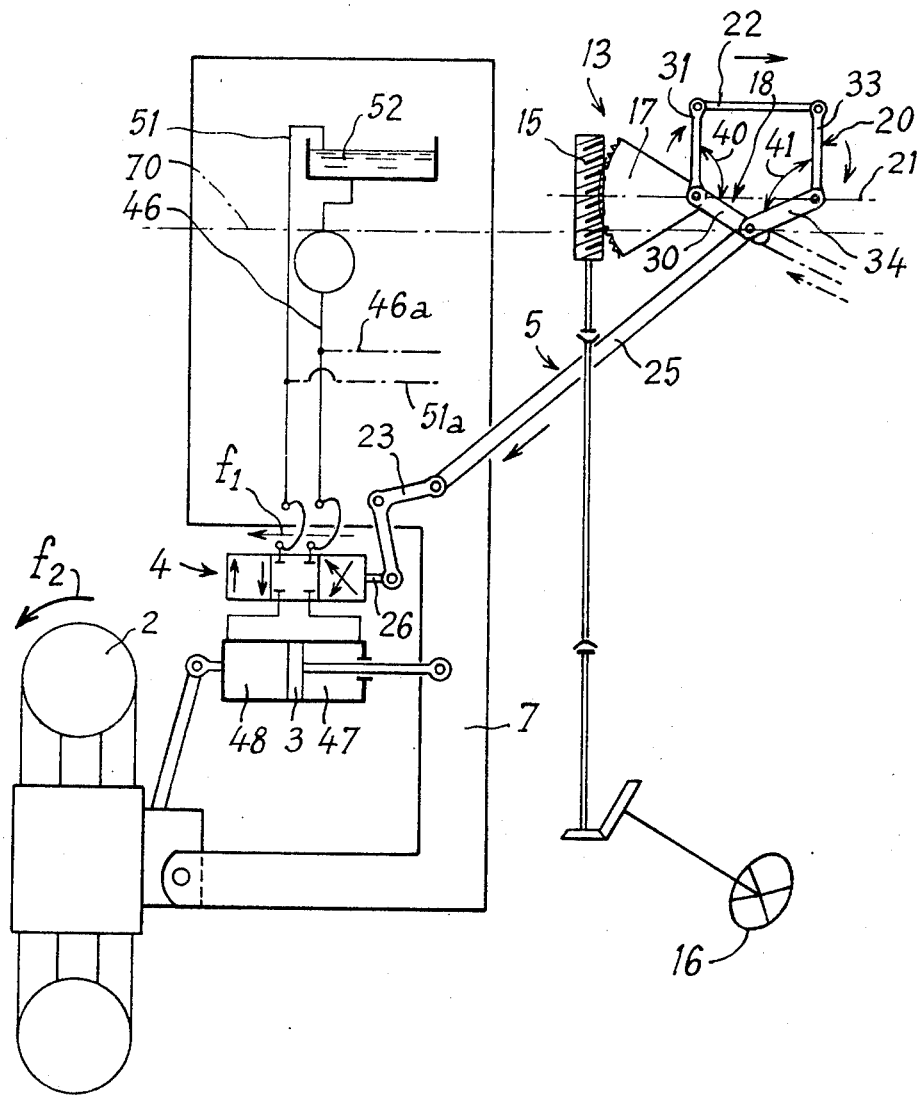

The accompanying drawings, given by way of example only, enable a fuller understanding of the characteristics of the invention. In the drawings:

FIG. 1 is a perspective view of a hydraulic control device according to the invention, and FIG. 2 is a schematic view showing the circuit of the control device.

In FIGS. 1 and 2 there is shown a control device according to the invention for the steering mechanism of a vehicle. The device more particularly relates to the two front steerable wheels of the vehicle and is the same for each wheel. There is no description here of the device for controlling the left hand front wheel.

The device comprises the following elements:
a pivot box 1 on which is pivoted the wheel 2 by means of a conventional stub axle (not shown),
a steering jack 3 of a double-acting type,
a hydraulic valve 4,
and finally a steering system 5.

The pivot box 1 is pivoted on an associated suspension arm 7 on an axis 6 which lies, in known manner, at a slight inclincation to the vertical.

The steering jack 3 is pivoted to the pivot box 1 by means of an arm 8 while a rod 9 of the jack is pivoted on the suspension arm so that the general axis of the jack is substantially transverse with respect to the axis 6. The jack 3 is situated towards the rear of the axis of rotation 6 of the wheel 2.

The hydraulic valve 4 is fixed longitudinally on the jack 3. In this manner, a valve member 12 of the hydraulic valve is dislaced relatively parallel to the general axis of the jack 3 in a valve housing of the hydraulic valve which is fixed to the jack 3.

The steering mechanism which controls the valve member 12 is constituted by:

an assembly 13 comprising a worm 15 connected to a steering wheel 16 and engaging with a toothed sector plate 17, a control rocking lever 18 connected to the toothed sector plate 17 and pivoted to the vehicle on a transverse and horizontal axis 19, an inverse rocking lever 20 pivoted under the lever 18 on a transverse and horizontal axis 21, a crank arm 23 of the transmission pivoted on the suspension arm by means of a bracket 24, a connecting bar 22 joining the rocking levers 18 and 20, and finally two transmission rods 25 and 26 connecting respectively the crank arm 23 to the rocking lever 18 and to the valve member 12.

The control rocking lever 18 is provided with an arm 30 directed downwardly and an arm 31 substantially horizontal. The rocking lever 20 also has two arms slightly offset axially a distance 32, one arm being a horizontal arm 33 situated under the arm 31 and the other being an arm 34 directed upwardly and attached to the arm 31 by the bar 22.

The control rocking lever 18 defines an angle 40 equal to the angle 41 defined by the inverse rocking lever 20. On the other hand, the lengths of the arms 30 and 34 and 31 and 33 are equal.

The construction of the device described above enables it to be seen that the control device represents for each steerable wheel a completely independent assembly starting from the interconnecting mechanism formed by the rocking levers 18 and 20 and the connecting bar 22. In the absence of physical connection between the two similar steerable wheels it should be noted that for travel of the vehicle in a straight line the geometrical axis passing through the joint in the end of the arms 30 and 34 is located on an axis 70 which lies on the axis of oscillation of the arms 7. Thus, the oscillation of the arms, caused by the suspension movements, has no affect of the general geometry of the steering and does not introduce any distortion into the Jeantaud working plan.

There is good reason to note moreover, according to the construction of the device of the invention, that the axis 70 is situated, in the position referred to above, at an equal distance from the axes 19 and 21, given that the arms 30 and 34 have equal lengths.

The hydraulic valve 4 communicates with the piping 46, leading fluid under pressure, either with the annular chamber 47 of the jack or with the other chamber 48 of the jack. These two chambers 48 and 47 can also be put in communication by the valve 4 with return piping 51 leading to a tank 52. Piping 46a and 51a lead to the valve of the control device of the second steerable wheel.

The device described above operates in the following manner:

For turning the wheels, the steering wheel 16 is operated in known manner to control the coupling mechanism of the two steering devices. For example the action on the steering wheel 16 perhaps causes a displacement of the mobile parts in the direction of the arrows to push the valve member 12 of the valve 4 in the direction of the arrow $f_1$, that is to say towards the exterior of the vehicle. Simultaneously, the coupling mechanism causes a valve member of a hydraulic valve of the second control device associated with the other steerable wheel to be displaced in an opposite direction.

The hydraulic valve 4 then puts the piping 46 into communication with the chamber 48 and the piping 51 into communication with the annular chamber 47. There results an extension of the jack 3 which makes the wheel 2 pivot in the direction of the arrow $f_2$. At the same time, the jack carries the valve housing of the hydraulic valve 4 displacing it with respect to the valve member 12 which is held by the crank lever 23. Thus, when the body of the distributor has axially "overtaken" the valve member 12, the latter interrupts the previously established communication, such that the supply of fluid is stopped and that the wheel 2 lies fixed in the new turning angle of the wheels. Thus a single position of the steering wheel corresponds to one signle turning angle of the two steerable wheels.

It should be noted that the device according to the invention provides a great advantage in maintaining the vehicle in the turning angle attained without any risk of free, unintentional pivoting of one of the wheels in the case of rupture of the supply-circuit of the associated device for said wheel. In effect, if the piping, for example 46 or 51 is broken, the wheel 2 is not able to be freely displaced about the axis 6 because the physical interconnection through the connecting mechanism opposes all independent pivoting of an action affecting the position of the steering wheel 16. This is achieved as a result of an inherent stability which tends to prevent, in the case of rupture, the complete deterioration of the control device, whatever the state of the supply circuit.

The arrangement according to the invention has been chosen, amongst other things, to simultaneously introduce the coefficient of correction required to give the correct steering geometry between the turning angles of the two steerable wheels.

With reference to FIG. 2 it will be seen that the steering mechanism is provided with two rocking levers including the arms 30 and 34 which have the characteristic of oppositely changing the sines of the angles which they define with respect to the plane of reference containing the superposed axes 19 and 21, such that it results in, by different linear displacements imposed upon the transmission rods 25 and upon the valve member 12, an equally different turning angle for the wheels 2. For the minimum turning circle required, it is sufficient consequently to choose a suitable value for the angles 40 and 41. Likewise a suitable length for the arms 30 and 34 may be chosen to optimize the associated steering geometry.

Another advantage of the apparatus of the invention is that the steering system 5 only transmits the "information" or the "orders" of the required turning angle to the motor parts whose function is to apply the effort of turning the wheels and of supporting the return forces imparted on the wheels. It follows that the control arrangements have great robustness.

What we claimed is:

1. In a control device for a steering mechanism of a vehicle including a pair of suspension arms mounted from the vehicle for vertical oscillatory motion independently of one another and a pair of guide wheels laterally pivotable in response to rotation of a steering wheel for conrolling the direction of travel of the vehicle, each guide wheel being mounted on a respective suspension arm for vertical oscillatory movement therewith, the improvement comprising:

hydraulic means for laterally pivoting the guide wheels, the hydraulic means including a pair of double-acting jacks, each jack being attached between a respective suspension arm and guide wheel in such a manner that the extension of each jack pivots a respective guide wheel, and a pair of valve means, each valve means being mounted on a respective jack for controlling the extension of a respective jack; a pair of linkages, each linkage being connected to a respective valve means for controlling the operation of a respective valve means; and a coupling mechanism connecting each of the linkages to the steering wheel in such a manner that the valve means are simultaneously controlled in response to rotation of the steering wheel so that both guide wheels are laterally pivoted in the same angular direction.

2. A control device according to claim 1, wherein each valve means includes a valve housing connected to a respective jack and a valve member slidably disposed in the valve housing.

3. A control device according to claim 2, wherein each of the linkages includes a crank arm pivotably mounted on a respective suspension arm and connected to a respective valve member externally of a respective valve housing, and a transmission rod connected between the crank arm and the coupling mechanism, each of the transmission rods extending substantially parallel to a longitudinal axis of the vehicle.

4. A control device according to claim 1, wherein the suspension arms are mounted for vertical oscillatory motion about a substantially horizontal axis; and wherein the linkages are connected to the coupling mechanism at respective points lying on said horizontal axis, when the guide wheels are in a straight-ahead position.

5. A control device according to claim 1, wherein the coupling mechanism includes a connecting bar; a first rocking lever pivotable about a substantially horizontal axis and connected to the steering wheel, the first rocking lever having a pair of arms of equal length, one of the arms of the first rocking lever being attached to one of the linkages, and the other arm of the first rocking lever being attached to the connecting bar; and a second rocking lever pivotable about a substantially horizontal axis and mounted in an inverted position relative to the first rocking lever, the second rocking lever including a pair of arms of equal length, the arms of the second rocking lever being substantially equal in length to the arms of the first rocking lever, one of the arms of the second rocking lever being attached to the connecting bar, and the other arm of the second rocking lever being connected to the other linkage in such a manner that when the coupling mechanism is actuated by the steering wheel the arms of both rocking levers are subjected to angular displacements having a sine value changing in an inverse ratio with respect to a substantially vertical plane containing said horizontal axes, whereby the guide wheels are laterally pivoted to different angular positions.

6. A control device according to claim 1, wherein the pair of valve means control the extension of respective jacks in such a manner that both of the jacks change length in proportion to the angle of rotation of the steering wheel.

7. A control device according to claim 1, wherein each jack is positioned substantially horizontally and transversely with respect to the vehicle.

* * * * *

UNITED STATES PATENT AND TRADEMARK OFFICE
CERTIFICATE OF CORRECTION

PATENT NO. : 3,986,578
DATED : October 19, 1976
INVENTOR(S) : Roger Chanal

It is certified that error appears in the above-identified patent and that said Letters Patent are hereby corrected as shown below:

On the Cover Page, after [73] Assignee, "Etat Francaise" should read --Etat Francais--;

On the Cover Page, after [30] Foreign Application Priority Data, "Mar. 29, 1975 France 75.11915" should read --Mar. 29, 1974 France 74.11915--.

Signed and Sealed this sixteenth Day of August 1977

[SEAL]

Attest:

RUTH C. MASON
Attesting Officer

C. MARSHALL DANN
Commissioner of Patents and Trademarks